July 26, 1955    P. R. ADAMS ET AL    2,714,199
PROJECTION DISPLAY APPARATUS
Filed Feb. 25, 1950    8 Sheets-Sheet 1

INVENTORS
PAUL R. ADAMS
JOHN L. ALLISON
BY
*R P Morris*
ATTORNEY

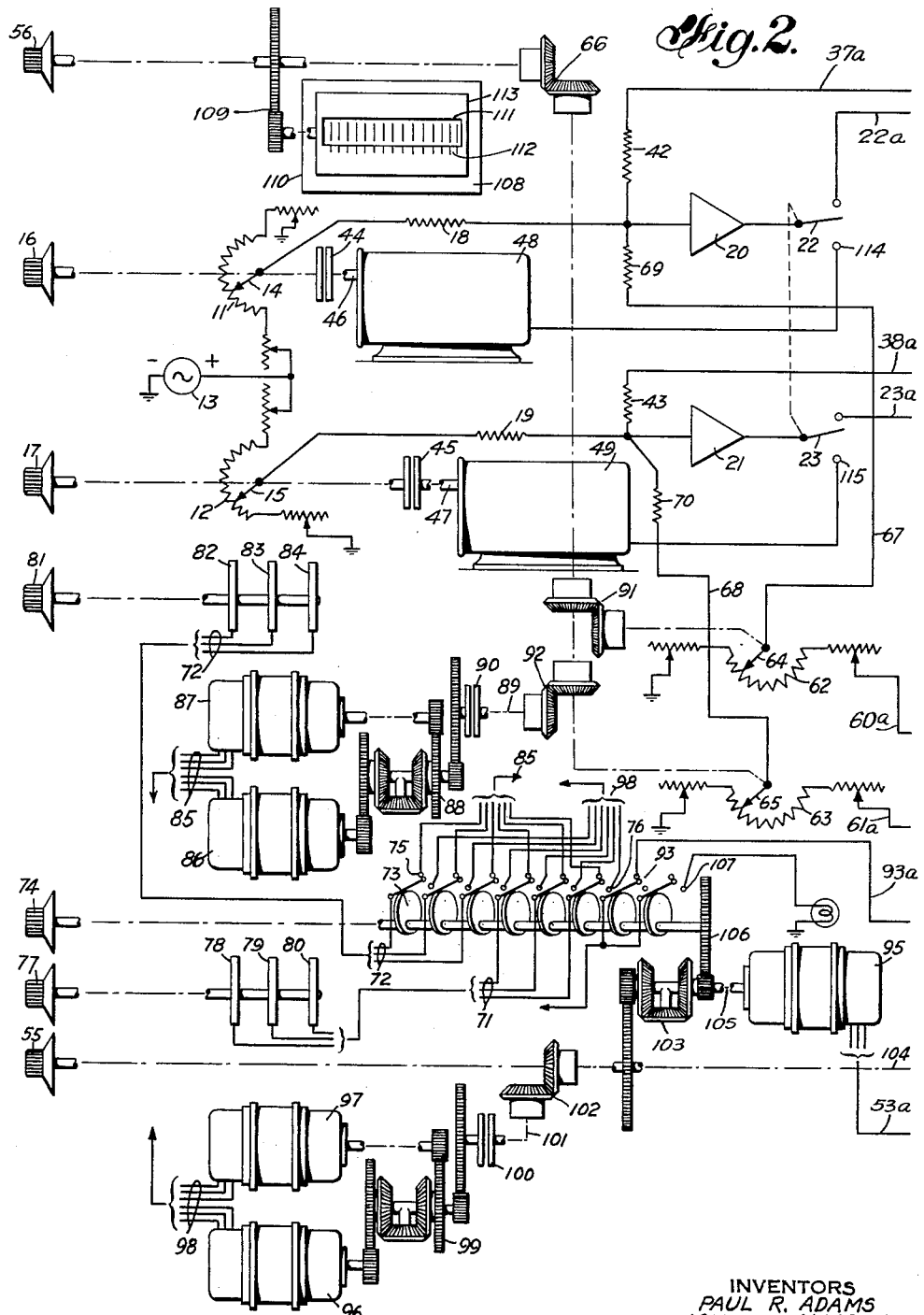

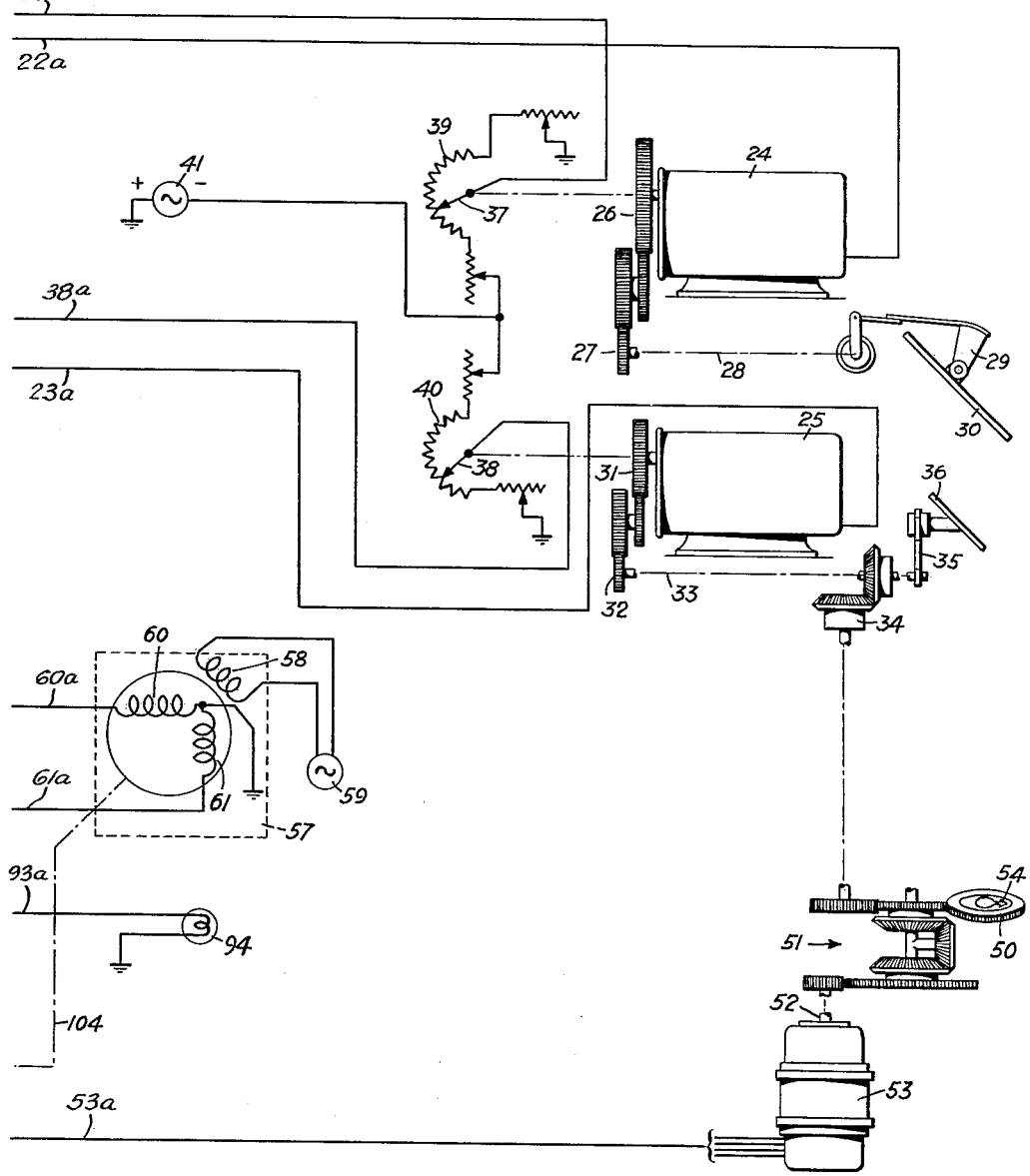

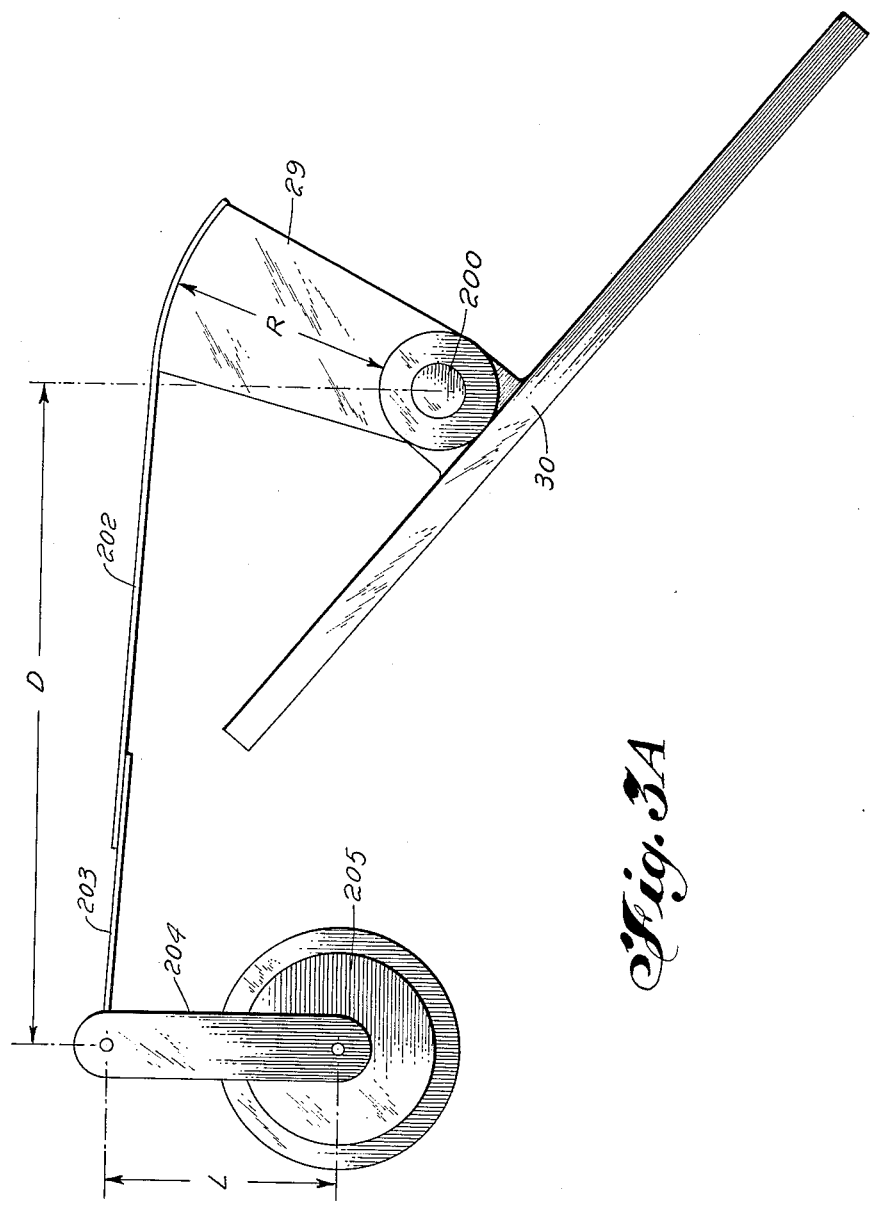

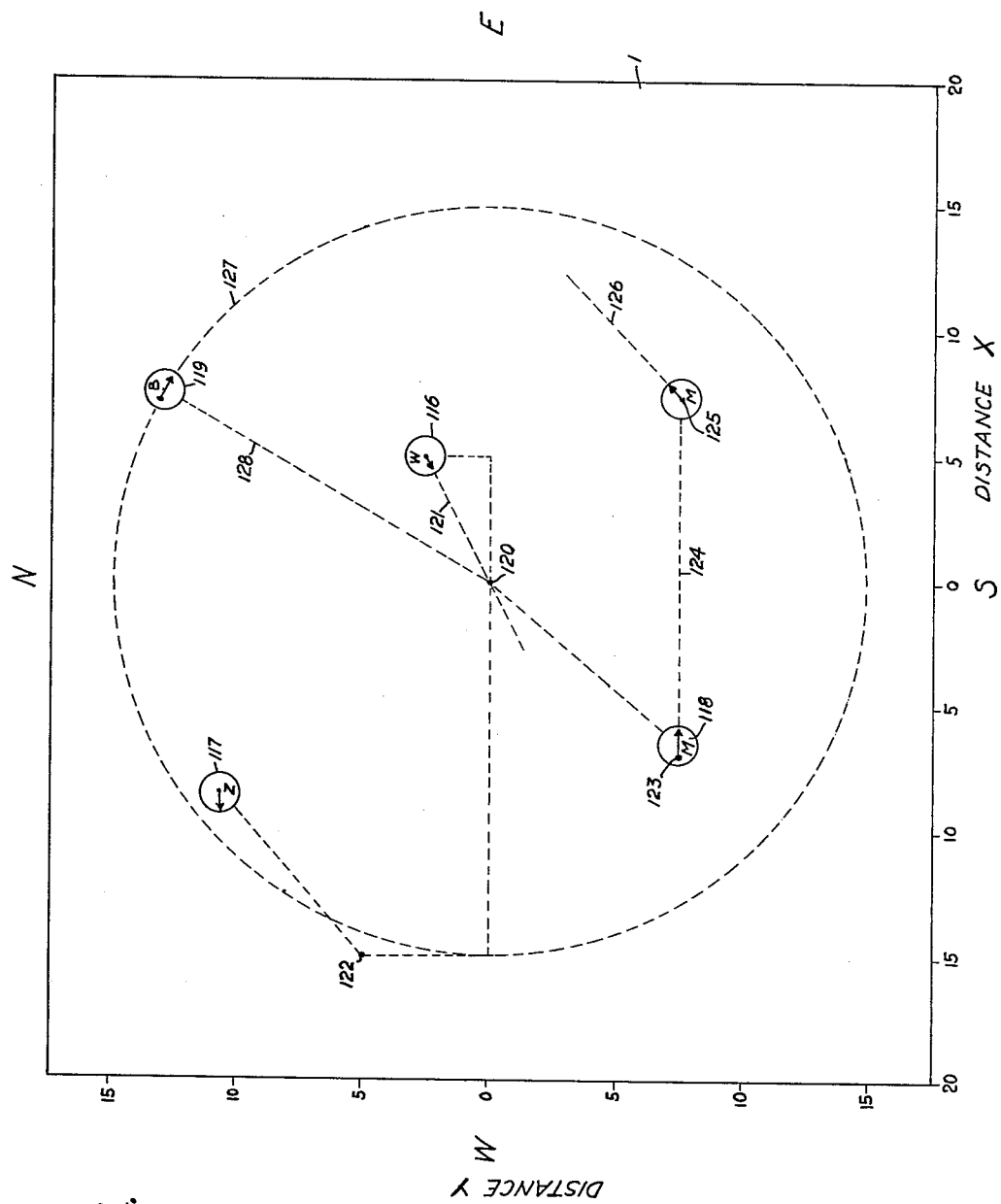

INVENTORS
PAUL R. ADAMS
JOHN L. ALLISON
BY R P Morris
ATTORNEY

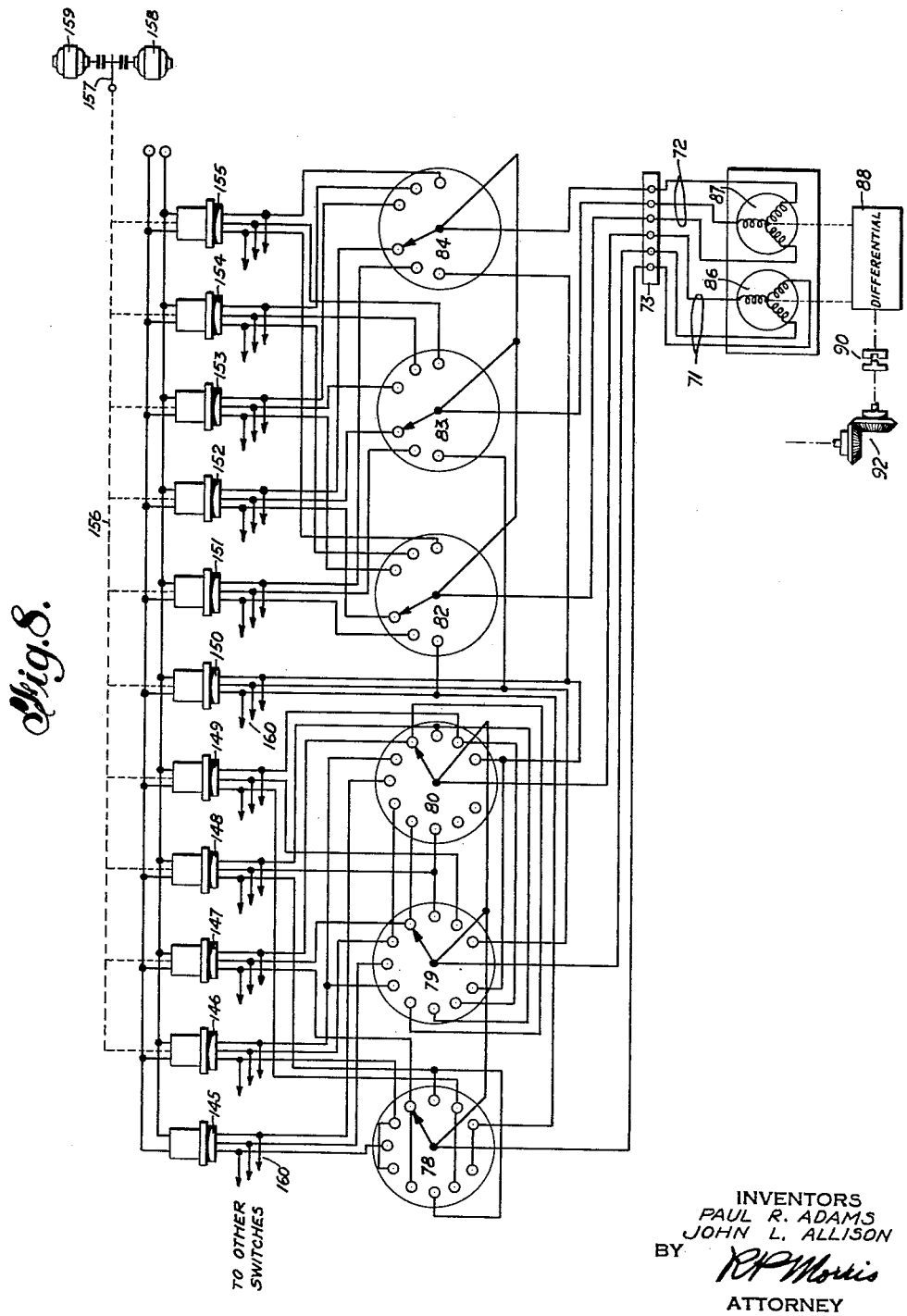

United States Patent Office 2,714,199
Patented July 26, 1955

2,714,199

PROJECTION DISPLAY APPARATUS

Paul R. Adams, Cranford, and John L. Allison, Nutley, N. J., assignors to International Telephone and Telegraph Corporation, a corporation of Maryland Application February 25, 1950, Serial No. 146,279

24 Claims. (Cl. 340—24)

This invention relates to a display apparatus for vehicles moving in a given area and more particularly to an apparatus and system for providing display of aircraft around a given area such as an airport.

Traffic display systems which afford a visual indication of the location of moving vehicles are quite commonly used. For example, displays are made in connection with railways and highways having fixed traffic lanes. These may be quite simply done as movement of objects is in a single plane and along fixed routes. Various proposals have been made in connection with air traffic to arrange for display of aircraft moving about a given area such as the vicinity of an airport. However, in these systems considerable difficulty arises due to the fact that the aircraft may fly in any route through the space and also may fly along the same route at different altitudes. To attempt such a display by means of lights moving along fixed routes or lines on a chart can clearly give only a rough approximation of the distance and direction of travel of the craft. It appears therefore that in order to provide the proper type of display for such craft a projection system is better suited as this will permit movement of an image in any direction about a fixed two-dimensional chart. With such a system it is of course necessary to orient the projection apparatus of the craft. It is also necessary that linear or craft paths may be traced by the image from these projectors. Furthermore, it is desirable that some form of coding be provided to indicate at least approximately the altitude of the various crafts.

It is an object of this invention to provide a system for controlling the movement of a projected image on a screen in direction, distance and speed to simulate the movement of craft about an area represented by the surface of the screen. Accordingly, a feature of this invention comprises a system in which a projector means is provided with separate driving means for moving the projector means in two orthogonal co-ordinates about a chart, there being provided means for establishing another co-ordinate reference on points anywhere on the chart and other means for providing distance and azimuth simulating components corresponding to the changes in distance and azimuth of the craft together with an arrangement for resolving these distances and azimuth co-ordinates in the orthogonal co-ordinates for use in controlling the position of the projected image on the screen. Further, there may be included a variable speed drive device for controlling the rate of movement of the projector means to simulate the rate of movement of a craft.

More particularly there is provided a pair of motors for controlling the position of a projector means in orthogonal co-ordinates which may be vertical and horizontal respectively. Driving controls for these motors are provided so that one motor will tend to move the projected image in the vertical for example, while the other will move the image in the horizontal co-ordinate. The distance and azimuth components may be derived from information concerning the speed of movement of the aircraft and its direction of travel, and magnetic or electrical means are provided to convert these components into input signals which may be also applied to the control motors to adjust the projected image. As the movement of the entire projector apparatus would require relatively large elements occupying considerable space it is preferable to move some elements of the projector such as rotatable mirrors to effect the position of the projected image. In order that the projected image may have a designation indicating the direction of travel of the craft an indicator is provided having an arrow head which may be projected on the screen, the direction of pointing of the arrow head being controlled by the azimuth component controlling means. An identifying code may also be projected to identify each of a plurality of craft represented on the screen. In addition a color coding may be adopted showing the indications in components of two or more colors which may be representative of different altitude levels for the travel of the aircraft. A variable speed drive is provided which will serve to control the azimuth or distance producing means, this variable control means being selectively adjustable to approximate an indicated speed of travel of the aircraft. Since the projection of the image must be from a point spaced a reasonable finite distance from the screen a compensation is required to take care of the difference in distance which would otherwise occur as the projected image is rotated to traverse it across the screen in the vertical or horizontal direction. Because a pair of rotatable mirrors are used and since it is not possible to rotate both mirrors about the axis parallel to the screen, movement of one of these mirrors will tend to cause rotation of the image as projected on the screen in certain positions. It is, therefore, necessary to provide compensation for the directional indication rotation if accurate indication of the direction of travel is desired.

The above-mentioned and other features and objects of this invention and the manner of attaining them will become apparent and the invention itself will be best understood by reference to the following description of an embodiment of the invention taken in conjunction with the accompanying drawing wherein:

Fig. 1 is a schematic drawing illustrating a typical assembly of the entire projector and control arrangement;

Figs. 2 and 3 taken together illustrate schematically a circuit diagram for electrical control of a projected image;

Fig. 3A is a schematic view of the mirror compensating means shown in Fig. 3;

Fig. 4 is a diagram of a typical screen layout used in explaining the operation of the system;

Fig. 8 is an illustration of the selectable variable speed drive mechanism for use in the system of our invention.

Figure 1:
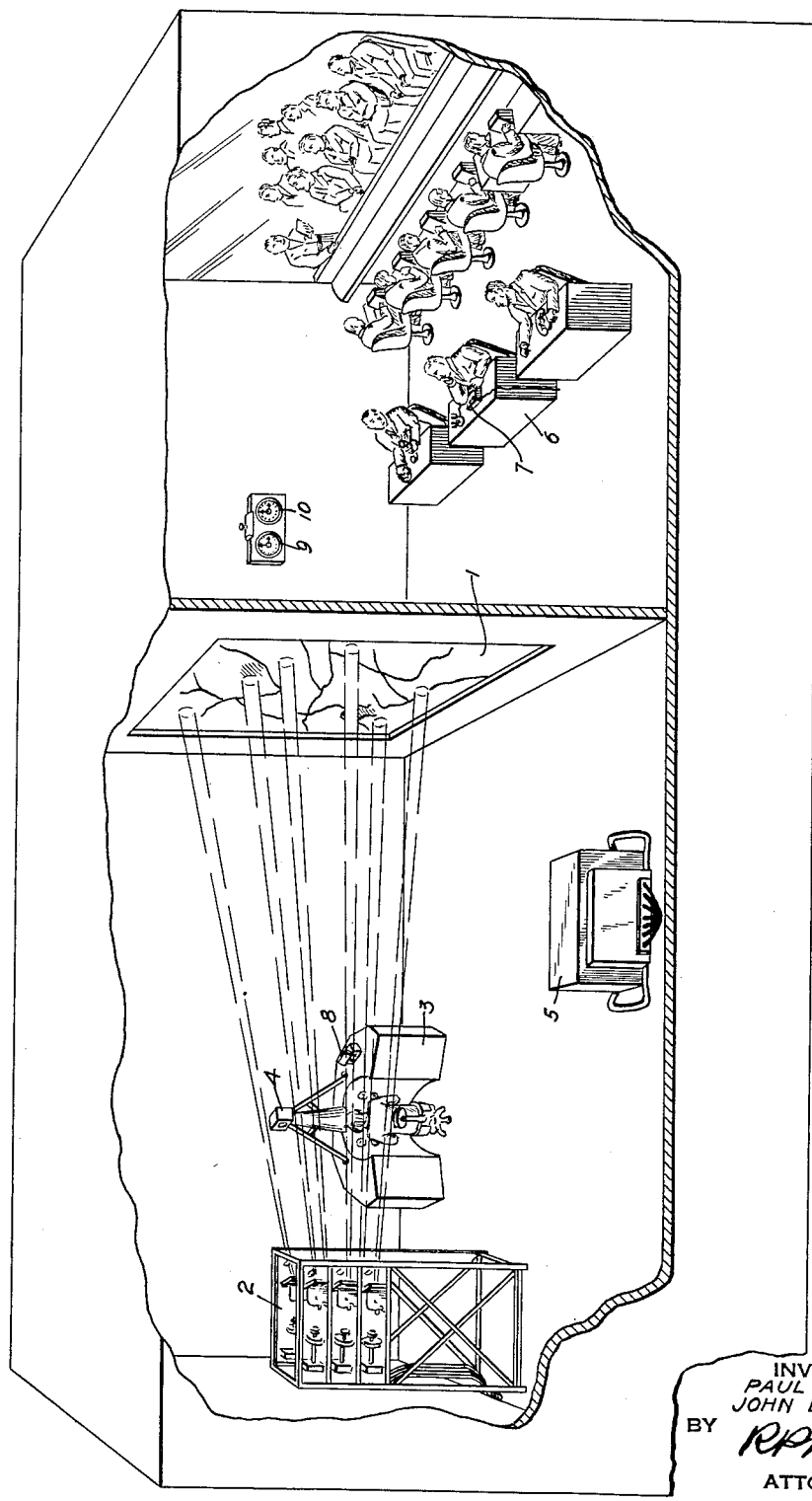

Turning first to Fig. 1, there is shown at 1 the projection screen upon which is provided a chart illustrating the area over which aircraft movements are to be indicated. At 2 is provided a bank of projector units, one for each craft to be indicated on screen 1. At 3 is illustrated a control console in which are provided a plurality of control knobs, not shown, which serve to control the orthogonal position of each projector unit in the vertical and horizontal co-ordinates for convenience referred to as the Y and X co-ordinates. Also at the console 3 are provided control elements for controlling the azimuth and distance indications which may be referred to for convenience as O and R components. There is also provided at console 3 a control switch for selectively controlling the time or speed drive of the images as projected on the screen. Information may be received by the operator at the control console in the form of written messages or in the form of projected images on a P. P. I. oscilloscope. At console 3 is provided a pick-up unit 4 which will pick-up the image projected on screen 1 reduce it in scale so that the image of the chart and the images projected thereon may be superimposed on the P. P. I. oscilloscope indication if desired for comparison with these indications. Such projection devices are well known to those skilled in the art. For example see U. S. Patent 2,581,358 having a common co-inventor with this invention.

The speed control and timing unit for movement of projectors 2 is indicated at 5. On the other side of screen 1 is provided a master control desk, this having on it normal communication apparatus for sending out messages to the craft concerning their orders as to their direction of flight and the like. On this desk is also provided a master control unit 7 which may be interconnected with speed control or timing unit 5. In timing unit 5 is provided means for speeding up the apparent movement of the craft as projected on screen 1 so that the future position and possible collision of craft may be observed in advance so that orders may be given to avoid collision. When the master control unit 7 is operated to effect a speed up a signal is also transmitted to control indicator unit at console 3 so that the operator at this console will not attempt to make any changes in the speed or positioning of craft until the speed up period is ended. At 9 and 10 in the master control room are shown an accurate electrical clock and a speed indicating clock respectively. The speed indicating clock 10 is controlled so that it will move in synchronism with the movement of the speed drive control unit 5 and similar indicator clocks are also provided in the control indicator unit 8 so that the operator may readily observe when the master control is released and the unit returned to normal.

Having given above a short description of the system we turn now to Figs. 2 and 3 which taken together show electrical units for a single projector corresponding to parts of 2, 3 and 5 of Fig. 1. It should be understood that while the electrical type of control system is considered preferable, the various electrical values therein may be mechanically duplicated by mechanical gearing arrangements as will readily be apparent to those skilled in the art. In the control console 3 is provided one computer for controlling each of the projectors shown in bank 2. The projector as illustrated in Fig. 3 is only partially shown as indicated by rotated mirrors but it will be clear that the control unit as described may be coupled to move the entire projector if desired instead.

For initially positioning the projector unit in the X and Y co-ordinates there is provided an X potentiometer 11 and a Y potentiometer 12. The potentiometers 11 and 12 may comprise 10,000 ohm resistors grounded at one end and coupled to the positive terminal of a first alternating energy source 13. Potentiometer taps 14 and 15 are each controlled in position respectively by the X control knob 16 and Y control knob 17. The voltage drop in each of these potentiometers may be coupled then through resistors 18 and 19 over X amplifier 20 and Y amplifier 21 switch armatures 22 and 23 and over lines 22a and 23a respectively to X projector servomotor 24 and Y projector servo-motor 25 respectively. Motor 24 is coupled over gearing 26 and 27, shaft 28 and compensating linkage 29 to rotatingly oscillable projection mirror 30 to control the projection of an image in the horizontal or X co-ordinates. Projection servo 25 is coupled over gearing 31, 32, shaft 33, gear box 34 and compensating linkage 35 to the Y projection mirror 36.

Referring to Fig. 3A an enlarged view of the compensating linkage associated with projection mirror 30 is shown. If the screen 1 was a sphere with its center at the projector, motion of mirrors 30 and 35 would result in orthogonal deviations whose linear dimensions were proportional to the angular deviations of the mirrors. However since screen 1 is flat and since the plurality of projectors needed for the plurality of images cannot be located at the same spot the above statement does not exist in fact. Thus equal angular deviations of the mirrors 30 and 35 the linear deviations of the image are smallest in the center of the screen 1 and increase toward the edges of the screen. A representation of a vertical line on screen 1 is straight but the representation of a horizontal line is curved being concave upward near the top of the screen and concave downward near the bottom of the screen. These distortions are identical to the distortions of meridians and parallels of the earth on a gnomic projection centered on the equator and may be termed "gnomonic distortion." The curvature of the lines of constant Y-value is too small to require correction, but the error in variation of magnitude is approximately 5.1% from the center to edge of the screen 1 and the difference between nominally equal values of X or Y from two projectors located in extreme position is, at the screen's edge, 3.3 inches which is an error too great to be tolerated.

The compensating or correction mechanism for correcting the variation in magnitude with a variation in direction comprises two identical link arrangements each associated with one of the mirrors 30 or 35, one of the link mechanisms being shown in enlarged view in Fig. 3A. The mirror 30 rotates on a shaft 200. A sector 29 of constant radius R attached to the mirror's axis of rotation has a metal ribbon 202 wrapped along its boundary arc. The other end of ribbon 202 is coupled to a link 204 whose length L is one-half the radius R of the above sector 29. The link 204 is attached to a selsyn 205 and the mirror axis may be spring loaded by a spring 203 to keep the metal ribbon under tension.

If the distance D between the link 204 and sector 29 is very much greater than the sector radius R, it may be seen that the rotation of the mirror 30 will be proportional to one-half the sine of the angle of the driving link 204 and the compensation for gnomonic distortion is accomplished.

Gear trains 26 and 31 respectively are coupled to sliders 37 and 38 of potentiometers 39 and 40 respectively which are preferably of the same value as potentiometers 11 and 12. These potentiometers however are coupled to a second source of alternating energy 41 preferably of the same potential as source 13 but coupled in phase opposition thereto. Sliders 37 and 38 are coupled to amplifiers 20 and 21 respectively over resistor units 42 and 43 respectively each preferably of the same value as the respective resistors 18 and 19. The control shafts from control knobs 16 and 17 are also coupled through clutch mechanism 44 and 45 to shafts 46 and 47 and to respective X and Y computer-servo motors 48 and 49. It will be seen that potentiometers 11 and 39, and 12 and 40 respectively provide bridge networks such that in the position of switch armatures 22 and 23, as shown coupled to the upper contacts, motors 24 and 25 would drive sliders 37 and 38 respectively into positions corresponding to those assumed by potentiometers sliders 14 and 15 so that the potential circuit two sources 13 and 41 would balance each other out. It is also clear that by adjusting X and Y control knobs 16 and 17 mirrors 30 and 36 will be positioned so that a projected image will be positioned at some other X and Y coordinates.

Turning to the projector unit a direction indicating disk is shown at 50. This disk is connected through gear train 51 and shaft 52 to a selsyn motor 53 which serves to control the arrow indicator 54 which may serve to show the direction of flight. The gear train 51 is coupled through to gear box 34 as indicated to compensate for rotation effects of a projected image of arrow 54, to be later described.

In order that manual adjustment of the projection as given by azimuth or $\theta$ readings and distance or R readings will be provided there are two other manual control knobs 55 and 56 provided which are designated as azimuth or $\theta$ control knob and distance or R control knob. The azimuth control knob is mechanically coupled to a resolver transformer 57 which serves to provide energy divided in accordance with the azimuth or $\theta$ angular indication. The resolver transformer 57 has energy supplied to its input primary 58 from a third alternating energy source 59. Two secondaries are provided as shown at 60 and 61 right angularly related to one another, winding 60 being designated as sine secondary and 61 as the cosine secondary. These secondaries are rotatable with respect to primary 58 under control of knob 55 so that energy from generator 59 will be fed to these units proportionally to the sine and cosine respectively of the azimuth or $\theta$ angle. Sine secondary 60 is coupled via line 60$a$ to a potentiometer resistor 62 and cosine secondary 61 is coupled via line 61$a$ to a potentiometer resistor 63. Respective sliders 64 and 65 are provided which may be adjusted manually by distance or R control knob 56 through gear box 66. Accordingly, it will be seen that output energy will be provided in lines 67 and 68 proportional to R sine $\theta$ and R cos $\theta$ respectively. These two output energies are applied over high resistors 69 and 70 preferably of the same value as resistors 18 and 19 to the respective X and Y amplifiers 20 and 21. Thus energy from these lines is combined with the input energy from control potentiometers 11 and 12 and applied to the respective projector servo motors 24 and 25 to control the position of mirrors 30 and 36 in accordance with the distance and azimuth. It should be understood that the input resistance of the amplifier is relatively low, so that the resultant input is the sum of the three voltages incoming over the input resistors, divided by three.

As so far described the equipment would serve manually to provide an adjustment for the image in X and Y co-ordinates on projection screen 1 to any desired position whether it is given in Cartesian co-ordinates or polar co-ordinates or any combination of both. In order further that the image may be moved about on the screen in accordance with simulated movement of aircraft it is desirable that some provision be made automatically to move this image. For this purpose input energy from the timing unit may be applied over cables 71 and 72 through cam controlled switch 73. Operation of switch 73 by control knob 74 serves to couple cables 71 and 72 by switch 73 to either of two sets of contacts 75 or 76 for moving the image across the screen in a straight line flight or orbital flight. The input energy at cables 71 and 72 is applied from speed control generator (Fig. 8 to be described later) over the control of tens speed selector knob 77 and selector switch elements 78, 79, 80 and hundreds speed selector knob 81 and selector switch elements 82, 83, 84.

Assume first that switch 73 is adjusted to close the straight line contact assembly 75 then the energy from the timing unit is applied over cable 85 to the straight line input, tens and hundreds selsyn motors 86 and 87. Motors 86 and 87 are intercoupled through a differential gear train 88 so that their respective drives can be made to add or subtract so that the selected speed drive will be provided for shaft 89 over clutch 90. This drive is carried over bevel gears 91 and 92 to potentiometer sliders 64, 65 and box 66 and serves to adjust sliders 64 and 65 along the potentiometer resistors 62 and 63 respectively in accordance with the speed indicated by the driving unit so that the R sin $\theta$ and R cos $\theta$ components applied to amplifiers 20 and 21 will continuously vary and will cause the projection mirrors 30 and 36 to move so as to control the direction of movement of the object at a speed corresponding to the input energy from the timing unit. In straight line flight position switch 73 closes contacts 93 which serve to close a lighting circuit for pilot light 94 via line 93$a$.

The arrow selsyn motor 53 is controlled by the arrow selsyn generator 95 over line 53$a$ which in turn may be controlled in position by manual $\theta$ knob 55 through gears 103 and shaft 105 so that the direction of arrow 54 is fixed when the azimuth direction has been selected by the manual adjustment of knob 55. Thus not only will the image move across the screen but the arrow on the projected image will point in the direction of flight.

Assume now that it is desired to have the aircraft image move in a circular orbit about the origin as set up by positioning of the various control knobs. Under these conditions it is clear that potentiometers 64, 62 and 65, 63 will remain fixed since they determine the radius of orbit of the craft. However, it is then necessary continuously to rotate secondaries 60 and 61 of resolver transformer 57 since the azimuth or $\theta$ angle is continuously varied. Under these conditions switch 73 is moved to the orbital contacts 76 in order to supply the speed control energy to orbit input selsyn motors 96 and 97 over cable 98. Motors 96, 97 are interconnected by differential gearing 99 and over clutch 100 drive shaft 101 at a speed determined by the energy applied over cables 71 and 72 through switch 73. Shaft 101 through bevel gears 102 and differential gear train 103 and shaft 105 serves to drive arrow selsyn generator 95 continuously, and shaft 104 will continuously rotate secondaries 60 and 61 of resolver transformer 57. Since under these conditions the direction of flight as indicated on the screen is a circle it is clear that the indicator arrow 54 should be tangential to the circle described instead of pointing in the direction of the R vector. Accordingly, a control shaft 105 is coupled by gear train 106 with switch 73 so that when this switch is turned to close contacts 93 the arrow selsyn generator will be shifted 90° so that the arrow will now be normal to the distance or R vector which controls the radius of rotation of the image. A pilot lamp is coupled to a power source by contact 107 of switch 73 when the switch is in its orbital flight position.

Preferably the selector switch for controlling the timing generator is calibrated in terms of straight line flight since this calibration will be constant for all directions of linear flight. It is clear that this same control adjustment will not be proper for describing orbital flight speeds. The speed control as used herein simply would provide a constant angular velocity for the image and thus would indicate higher speeds for orbital flights at a larger radius than at a smaller radius. In order to take care of this matter an additional calculator is incorporated in the equipment so that the linear flight speeds may be properly adjusted for any given orbital flight. The speed calibrator is shown at 108. A coupling gear train is shown at 109 for coupling this calibrator with the straight line input selsyns 87 and 86. This gear train is so chosen that at some given intermediate distance on the screen the orbital flight indication will be the same as for the linear flight. On calculator 108 is provided a housing 110 having a window 111. On the outer edge of window 111 is provided a fixed calibration 112 which corresponds to the linear flight settings. On a rotatable cylinder 113 are provided a series of different calibrations which may be visible through window 111 for different rotatable positions of the cylinder 113. These calibrations are preferably made in a different color from the calibration markings 112 and are so adjusted that the calibrations seen through the window designate the orbital speeds corresponding with the linear speeds shown at calibrations 112. Thus it is merely necessary to adjust the speed control of the timing switches so that the indicated speed will correspond in straight line value to the desired orbital speed as it appears through the window of the calculator.

As so far described the calculator will operate to provide desired linear or orbital flight indications from a given pre-set origin. In some cases it may be desired to change to a new origin particularly in linear flight. One example of when this is desirable, is, when an aircraft in linear flight makes an angular turn and continues in another direction. For this purpose the switches 22 and 23 may be moved from the contacts at which they are shown into connection with the lower set of contacts 114 and 115 respectively. This disconnects the X and Y projection servomotors 24 and 25 so that the projected image will remain fixed on the screen. This upsets the balance and computer servomotors 48 and 49 are then energised from the outputs of amplifiers 20 and 21 respectively. If now distance knob 56 is adjusted so that the distance indication is zero then the energy supplied from the output of amplifiers 20 and 21 will serve to drive motors 48 and 49 and through shafts 46 and 47 and clutches 44 and 45 to adjust potentiometer sliders 14 and 15 of X and Y control potentiometers 11 and 12 to a new position corresponding to the X and Y co-ordinate positions of the projected image as determined by the mirrors. Thus when switches 22 and 23 are returned to their operating position projector servos 24 and 25 will proceed to indicate a new movement of the object from the new origin. The direction of this movement may be controlled by adjustment of the θ selective knob 55 as desired.

Turning now to Fig. 4, a view of typical images projected onto the display screen is schematically shown in order to help in the explanation of the operation of the apparatus of this invention. The rectangle 1 may represent the screen as shown in Fig. 1. On it are shown arrows and letters within circles which represent projected images as shown at 116, 117, 118 and 119. Turning first to 116, it will be assumed that an aircraft has been designated as being five miles east and two and one half miles north of the center of the chart 120 and it is indicated that this craft is headed directly toward this center. The operator will then set the X and Y control knobs 16 and 17 for the initial co-ordinate position to designate five and two and a half mile positions and will adjust azimuth knob 55 for the angle indicated setting the R knob for zero. He will then select a speed from the timing generator corresponding to the speed of the aircraft and will apply this energy to the straight line indicating selsyns 86 and 87. The projected image of the craft will then continue to follow along a line 121 toward the center 120 of the screen. This is the simplest form of adjustment to be required.

Suppose next we consider image 117 and assume that it was reported as being ten miles northeast of a given radar station 122. It is known that this radar station is fifteen miles west and five miles north of the center 120. The X and Y control potentiometers are then first adjusted to this position, the distance knob 56 is then adjusted for position R equals ten miles and the azimuth knob adjusted to indicate azimuth position northeast. These values are then resolved in the calculator and mirrors 30 and 36 adjusted to project the image into the position shown at 117. Azimuth knob 55 is then turned to adjust for flight due west, then the speed selection given for the craft is made and the switch 73 is turned to contacts 75 so that the image will continue to move in a westerly direction on the screen from the initial coordinate point which was first established.

For a third type of a designation we will assume that a craft 118 has been located on the screen starting from the point 123. This may have been established originally by either of the methods outlined above. Assume that this craft travels along the line 124 to the point 125 and here it changes direction in accordance with line 126. It will be evident that if the direction of flight is merely changed by turning azimuth knob 55 to this new flight direction this will merely serve to rotate the vector indicated by line 124 about its origin point 123 and will not give a true picture of the linear progress of craft image 118. Under these circumstances the reset operation is necessary in order that a new origin be established at point 125. This adjustment is accomplished by throwing re-set switches 22 and 23 into contacts 114 and 115. This disconnects the motors so that the image remains at point 125. The distance knob is then adjusted to zero distance and the computer servo motors 48 and 49 adjust the X and Y control potentiometers from their original position to a point providing voltages corresponding to the new origin point 125. The azimuth knob 55 is then operated to provide a new azimuth designation and to operate the arrow disc 50 to the proper orientation. Then if the speed is not changed switch 73 is thrown onto contacts 75 and the image projection continues to follow along new line 126. If there has been a change of speed a new adjustment of the speed selector switch is first made before the power is reconnected.

A fourth condition of operation is shown by the image 119 following an orbital flight path 127. Under these conditions switch 73 is thrown onto contacts 76 with distance indicator adjusted for the fifteen miles radius indicated on the figure. At the same time the arrow disc is adjusted 90° from the origin line 128. Also the correct orbital speed for the fifteen mile radius circular orbit is selected and the projection continues to follow along the circular line 127 as indicated. If instead of 119 one of the other craft such as 117 were flying in an orbital path around some other point such as 122 the same conditions would apply. In this position however control knobs 16 and 17 would be adjusted to set the origin point for the orbital flight as indicated.

Under certain circumstances when a P. P. I. oscilloscope display is provided proper positioning under control of a flight indication may be obtained even though precise information as to the original location of the craft is not known.

Figure 5:
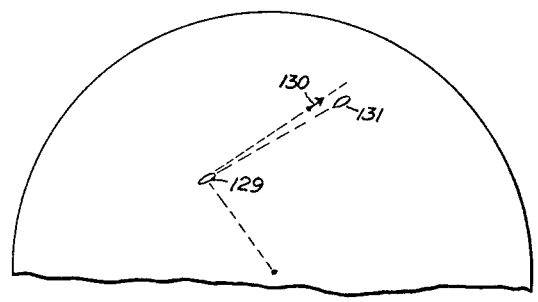
Fig. 5 is an illustration of a portion of a display oscilloscope arrangement used in explaining certain features of operation of the system.

Turning to Fig. 5, the manner in which this can be accomplished will be explained. In Fig. 5 a portion of a radar screen is illustrated. We may assume first that a particular craft as indicated by the spot 129 is to be traced on the projection screen. Since a radar screen must necessarily be of relatively low visual persistence, the direction of flight of a craft designated by spot 129 can not be precisely determined. However, there is a slight trailing illumination which gives a general idea of the direction of flight. Since the operator has available an image of his chart superimposed on the screen of the oscilloscope, he may thus obtain a general idea of the origin location of the plane which provided the spot 129. With this information the computer apparatus is adjusted to provide an origin corresponding to the appearance of spot 129 as indicated on the projection chart. The azimuth direction is selected as nearly as possible to correspond with that indicated by spot 129. The speed control may also be adjusted in accordance with the estimated speed of this craft. The projector is then energised and an image is thrown onto screen 1. In a few minutes time the projected image may again be compared with the oscilloscope screen. If we assume at this time the projected image now appears on the oscilloscope screen at point 130, while the actual spot 129 is moved into a new position 131, the divergence of the spot 129 both in angle and distance may be observed. The operator at the control console will then adjust the azimuth knob 55 so as to bring spot 131 and point 130 into linear relationship and will also adjust distance knob 56 so that the two are superimposed. He may also adjust the speed selector switch to compensate for any difference in distance. Thus he has located on the projection screen the actual location and direction of travel of the craft represented originally on the oscilloscope by the spot 129.

Figure 6:
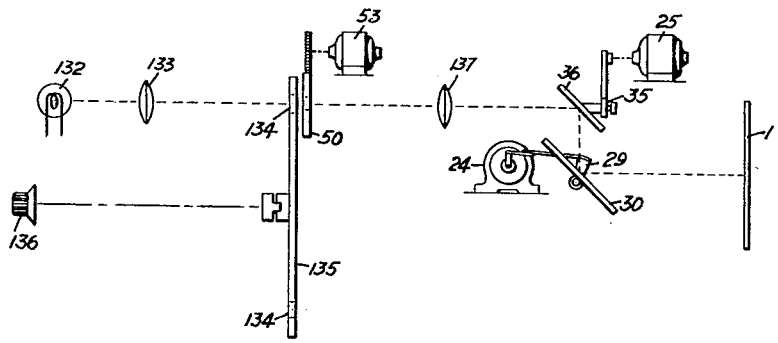
Fig. 6 is a schematic drawing and illustrates a projector unit for use in the system as described.
Figure 7:
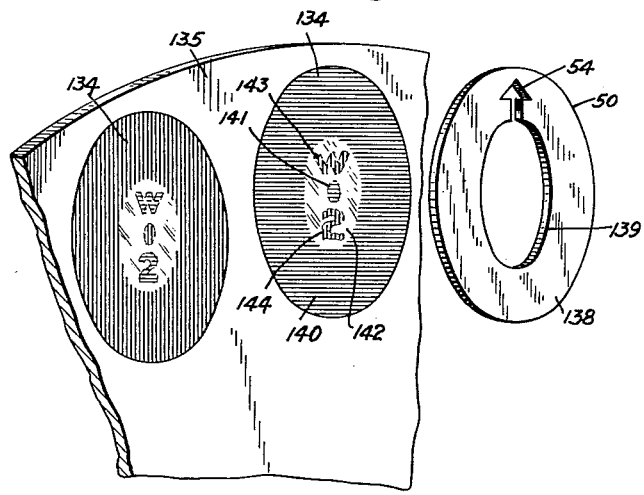
Fig. 7 is an exploded view illustrating the combination of elements forming the projected image.

Turning now to Figs. 6 and 7, a description of the projector unit as provided in the display system is given. From a light source 132 light is focused by means of focusing lens 133 onto the arrow disk 50 through the color disk 134 used for coding the signal. The color disks 134 are mounted on a coding wheel 135 which may be controlled by a control knob 136. An image of the arrow disk 50 and the color disk 134 is projected by means of lens 137 onto the Y deflection mirror 36 and hence onto the X deflection mirror 30 to screen 1. The arrow disk 50 as shown in a fragmentary exploded view, Fig. 7 may consist of a ring portion 138 having an indicating arrow formed as opening 54, the remaining portion of the disk having a circular opening 139. The color disk 134 is arranged behind disk 50 for positioning to a given color combination to provide altitude coding. This color disk has an outer ring portion 140 which may be of a given color such as blue and preferably a central dot portion 141 which is preferably of the same color as the outer ring 140. The inner transparent portion 142 is provided which has provided therein identification indication 143—144 preferably comprising a combination of letter and numerals for identifying a particular plane. These identifying portions are in a different color, for example, red so that the combination of the blue arrow and dot and the red identification numbers give an indication of the altitude of the plane. Other color disks 134 are provided with contrasting color combinations to provide a coding for other altitudes of the craft. The particular altitude coding may be selected by means of knob 136 which serves to turn the coding disk 135 to the appropriate position for projecting the desired image onto the screen.

In Fig. 8 is shown the speed control generator used in connection with this system. This speed control unit comprises 11 selsyn generators which through a proper choice of speeds enables the selection of any speed from zero to 600 miles per hour for the movable image. Thus in the tens unit arrangement are provided zero R. P. M. selsyn 145, 10 R. P. M. selsyn 146, 20 R. P. M. selsyn 147, 30 R. P. M. selsyn 148, 40 R. P. M. selsyn 149 and 50 R. P. M. selsyn 150. In the hundreds generator are provided the 5 selsyn generators 151–155 which operate at 150, 250, 350, 450 and 550 R. P. M. respectively. All of these selsyn generators except zero R. P. M. generator 145 are coupled to a common drive shaft 156 which may be coupled through a clutch 157 to normal drive motor 158 or accelerated speed motor 159. These generators and motor drives are common to all of the projectors so that by proper combination of any of the speeds in additive or subtractive relation the various speeds between zero and 160 R. P. M. may be selected for travel of the craft displays. These separate generators are coupled as indicated through individual contacts on the tens switch disks 78, 79 and 80 and the hundreds switch disks 82, 83 and 74 and from these disks over the flight control switch 73 and cables 71 and 72 respectively of selsyn motors 86 and 87, which in turn are coupled through generator gear train 88 and gear train 92 to the computer apparatus as shown in Fig. 3. As shown in the Fig. 8 the switch is positioned to indicate a flying speed of 270 M. P. H. This is done by adjusting the hundreds switch to the 200 position and the tens switch to the 70 position. It will be seen that this couples the 250 R. P. M. generator to motor 87 and the 20 R. P. M. generator to motor 86. In this particular relationship the two motors are coupled to drive in the same direction so that the speed indications will add. If a speed of 100 M. P. H., for example, were to be indicated then the 100 switch would be turned to the 100 position and likewise the tens switch would be turned to the zero position. This will couple the 150 R. P. M. generator to motor 87 and will couple the 50 R. P. M. generator of the tens generator unit to motor 86 but in such phase relation that this motor will drive in the opposite direction to motor 87 so that the 50 will subtract from the 150 in the ultimate drive to gear train 92. By proper choice of the switching positions any of the speeds between zero and 600 M. P. H. can be chosen. As indicated by lines 160, the output of the generators may be coupled to other switches.

When it is desired to accelerate the speed so as to predict where the craft will be at some future period of time, clutch 159 is operated to couple the common shaft 156 to the accelerated speed motor 159. This motor is preferably made to drive the generators at much higher speed, for example, 20 times that of the normal drive so that generators 146–155 will then generate frequencies 20 times their normal operating frequencies. Thus all the motors 86–87 on the projectors of this particular bank will be driven at this accelerated speed so that the craft will appear to be travelling at a much higher rate on the screen. At the same time motor 158 continues to rotate so that when it is desired to return to normal operating speeds the shaft will again be clutched at a position which will simulate the normal drive position that they would have followed had the acceleration not intervened.

Figure 9:
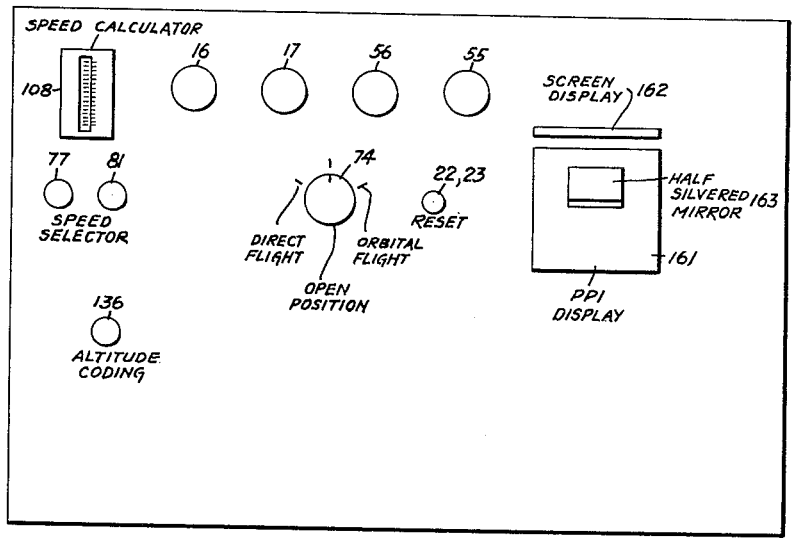
Fig. 9 is a diagram of a control console panel.

In Fig. 9 is illustrated a panel which might be provided at the control console 3. On this panel are shown the various control knobs 16 and 17 for the initial X, Y coordinate position, 55 and 56 for the $\theta$ and R positioning, re-set switch 22 and 23; and the direct and orbital flight control switch 74 which may be turned to the central open position or to the direct flight or orbital flight positions. The speed selector switches are shown at 77 and 81, the altitude coding control 136 and the speed calculator at 103. In addition at the right hand side of the screen is shown an arrangement for combining the normal P. P. I. display and the screen display for simultaneous observation. In this arrangement 161 represents the P. P. I. display screen and 162 the reproduced screen display of the projection screen 1. This may be arranged for example, at right angles one to another and interposed at a 45° angle in a half silvered mirror 163 which may be arranged to cover only a portion of the screen but be provided with optical means for superimposing effectively both screens for viewing. If desired this may be arranged so that the operator may see the two superimposed screens with one eye and only the P. P. I screen with the other eye so that by blinking one eye he may see either the pure P. P. I display or the combined displays.

While we have described a single embodiment of our invention as exemplifying in a system which was actually constructed and operated, it is clear that the principles of our invention as disclosed herein may be achieved by other means. It will be readily apparent to those skilled in the art for example, that various types of mechanical drives may be substituted for the electrical drives illustrated herein. Furthermore, various substitutions of different types of elements throughout the system may be readily made by those skilled in the art without the exercise of inventive art.

Also, while we have described above the principles of our invention in connection with specific apparatus, it is to be clearly understood that this description is made only by way of example and not as a limitation to the scope of our invention.

We claim:

1. A system for controlling the movement of a projected image movable on a screen in first and second orthogonal coordinates, comprising projector means, separate motor means for moving said projector means to move said image in the respective coordinates, a source of drive energy for said motor means, means to establish separate initial coordinate reference drive positions for said motor means, means for providing distance simulating and azimuth simulating components, means for combining effects of said distance and azimuth components to produce respective corresponding coordinate control components, and means for applying said coordinate control components respectively to said motor means to establish the position of said projected image.

2. A system according to claim 1, further comprising a speed control device and means for alternatively varying said distance simulating component or said azimuth simulating component under control of said speed control device to adjust progressively the projected position of said image.

3. A system according to claim 1, further comprising a speed control device and means for varying said distance simulating component under control of said speed control device to adjust progressively the projected position of said image in a straight line across said screen.

4. A system according to claim 1, further comprising a speed control device and means for varying said azimuth simulating component under control of said speed control device to adjust progressively the projected position of said image in a circular orbit whose radius is determined by said distance simulating component.

5. A system according to claim 1 wherein said projector means comprises two mirrors positioned to receive an image on one mirror and reflect it to the other mirror and from said other mirror to the screen, said motor means being coupled respectively to said mirrors to move them in accordance with the respective co-ordinates.

6. A system according to claim 5, wherein said screen is a flat screen, further comprising compensating mechanism coupling the respective mirrors to said drive means to compensate for the distortion of the path of movement of said image because of the finite spacing of said projector and screen.

7. A system for controlling the movement of a projected image movable on a screen in first and second orthogonal coordinates, comprising projector means including two mirrors positioned to receive an image on one mirror and reflect it to the other mirror and from said other mirror to the screen, separate motor means for moving said projected means to move said image in the respective co-ordinates, said motor means being coupled respectively to said mirrors to move them in accordance with the respective coordinates, a source of drive energy for said motor means, means to establish separate initial coordinate reference drive positions for said motor means, means for providing distance simulating and azimuth simulating components, means for combining effects of said distance and azimuth components to produce respective corresponding coordinate control components, means for applying said coordinate control components respectively to said motor means to establish the position of said projected image and further including a device having a direction indicating designation, means for adjusting said device under control of said means-for-providing-said-azimuth-simulating-component, and means for projecting an image of said device onto said mirrors to provide the movable projected image.

8. A system according to claim 7, further comprising an identifying device, and means for projecting an image of said identifying device onto said mirrors simultaneously with said direction indicating device to provide identification and direction indications on said movable projected image.

9. A system for controlling the movement of a projected image movable on a screen in first and second orthogonal coordinates, comprising projector means including two mirrors positioned to receive an image on one mirror and reflected to the other mirror and from said other mirror to the screen, separate motor means for moving said projector means to move said image in the respective coordinates, said motor means being coupled respectively to said mirror to move them in accordance with the respective coordinates by oscillating said one mirror about an axis perpendicular to said screen and at 45° to the surface of said one mirror and said other mirror about an axis parallel to the surface of said one mirror and to one of said orthogonal coordinate axes and further comprising a device having a direction indicating designation, means projecting an image of said designation onto said screen whereby displacement of the projected image by oscillation of said one mirror causes a rotation of said designation on said screen, and compensating means controlled by movement of said one mirror coupled to said drive to compensate for said rotation.

10. A system according to claim 9, further comprising means for adjusting said device under control of said means for providing said azimuth simulating component to orient said direction indicating designation therewith.

11. A system for controlling the movement of a projected image movable on a screen in first and second orthogonal coordinates, comprising projector means, separate motor means for moving said projector means to move said image in the respective coordinates, a source of drive energy for said motor means, means to establish separate initial coordinate reference drive positions for said motor means, means for providing distance simulating and azimuth simulating components, means for combining effects of said distance and azimuth components to produce respective corresponding coordinate control components, means for applying said coordinate control components respectively to said motor means to establish the position of said projected image and further including a device provided with a direction indicating designation, and means including said projector means for projecting an image of said device onto the screen to provide said projected image.

12. A system according to claim 11, further comprising an adjustable color coding means, operatively mounted with respect to said device to provide a color coding of said designation, and means to adjust said color coding means to produce different coded colors of said projected image.

13. A system according to claim 2, wherein said speed control device is capable of providing speeds of different values, further comprising adjustable means for selectively controlling said speed control device.

14. A system according to claim 13 wherein said speed control device is designed normally to provide a speed of movement of said image on said screen simulating the normal speed of movement of a craft, further comprising means for increasing said speed of movement to simulate future positions of said craft following the same course.

15. A system according to claim 2 further comprising adjustable means for adjustably controlling each of said means to establish separate coordinate reference drive positions, said means for providing distance simulating components, said means for providing azimuth simulating components and said speed control device whereby the position of said projected image may be adjusted to simulate the position and speed of movement of a craft and further comprising a control console at which said normally adjustable means are mounted, a radar display device mounted adjacent said control console, optical means for picking up an image of said screen and reducing it to the size of the radar display, and means for superposing said reduced image and said radar display, whereby by adjustment of said manually adjustable means said image may be positioned to coincide with a predetermined display mark on said display device.

16. A system according to claim 1, wherein said motor means are electric motors, said means to establish separate co-ordinate reference drive positions comprise electrical energy sources and means for applying energy from these sources to said motors, said means for providing distance and azimuth simulating components comprise sources of electrical energies proportional to the simulated components, and said means for combining said components comprise a circuit to combine said azimuth simulating energy as sine and cosine functions respectively of said distance component to produce co-ordinate control voltages.

17. A system according to claim 3, further comprising means for intercoupling said means-to-establish-initial-coordinate-drive-positions and said means-for-establishing-distance-and-azimuth-simulating-components to provide for mutual movement of these intercoupling means, means for disconnecting said means-to-establish-initial-coordinate-positions from said motor means, and means for adjusting said means-for-providing-distance-simulating-components to zero, whereby the image will be rotated under control of said means-for-providing-azimuth-simulating-components to a desired direction, at the reference coordinate position existing at the time said disconnection is made.

18. A system for controlling a projected image of a craft movable on a screen in first and second orthogonal coordinates, comprising projector means, first and second drive motors for moving said projector means in the respective coordinates, a first source of drive energy for said motors, means to control separately first and second components of energy from said first source to establish respective first and second initial coordinate energies, a second source of drive energy, an adjustable phaser unit coupled to said second source to provide components proportioned to sine and cosine functions of an azimuth designation, two variable potentiometers adjustable to simulate distance components coupled to said second source over said phaser unit whereby energy will be provided in the separate potentiometers, coordinate control potentials corresponding to orthogonal projections of the distance components, means for combining the respective components of said first source and said coordinate control components, means for applying said combined components to respective of said drive motors, and selectively controllable means for alternatively changing said adjustable phaser unit or said variable potentiometers at a selected speed simulating the speed of movement of the craft.

19. A system according to claim 18, wherein said selectively controllable means comprises two reversible synchronous driving motors, differential gear means for combining the drive of said two driving motors, a first set of generators operable to generate energy differing in frequency by discrete unit frequency differences, a second set of generators operable to generate frequencies differing in frequency by discrete frequency differences which are a multiple of the first named frequency differences, a common means for driving all said generators and means for selectively coupling the outputs of a generator of each set of generators to respective of said synchronous motors, comprising a first switch for said first set of generators for applying the output energy of a predetermined of said first set of generators in a given phase direction or in opposite phase direction to its associated synchronous motor, and second switch means for applying the outputs energy of a predetermined one of said second set of generators in said given phase direction to said second set of generators to the associated synchronous motor.

20. A system according to claim 19 further comprising a first drive means for normally driving said generators at a first normal speed, a second drive means for driving said generators at a speed higher than said normal speed, and means for alternatively coupling said generators to said first or second drive means.

21. A speed selective drive comprising two reversible synchronous driving motors, differential gear means for combining the drive of said two driving motors, a first set of generators operable to generate energy differing in frequency by discrete unit frequency differences, a second set of generators operable to generate frequencies differing in frequency by discrete frequency differences which are a multiple of the first named frequency differences, a common means for driving all said generators and means for selectively coupling the outputs of a generator of each set of generators to respective of said synchronous motors, comprising a first switch for said first set of generators for applying the output energy of a predetermined of said first set of generators in a given phase direction or in opposite phase direction to its respective synchronous motor, and second switch means for applying the outputs energy to a predetermined one of said second set of generators in said given phase direction to said second set of generators to the respective synchronous motor.

22. A system according to claim 21, further comprising a first drive means for normally driving said generators at a first normal speed, a second drive means for driving said generators at a speed higher than said normal speed, and means for alternatively coupling said generators to said first or second drive means.

23. A projector for projecting an image on a flat screen in two orthogonal coordinates comprising two mirrors positioned to receive an image on one mirror and reflect it to the other mirror and from said other mirror to the screen, drive means being coupled respectively to said mirrors to move them in accordance with the respective coordinates, and compensating mechanism coupling the respective mirrors to said drive means to compensate for the distortion of the path of movement of said image because of the finite spacing of said projection and screen.

24. A projector for projecting onto a screen an image including a designation indicating the direction of movement of said image on said screen comprising a movable image producing means carrying said designation, two mirrors positioned to receive an image of said image producing means and to reflect it to the other mirror for projection on said screen, drive means coupled to said mirrors, to oscillate said one mirror about an axis perpendicular to said screen and at forty-five degrees to the surface of said one mirror, and said other mirror about an axis parallel to the surface of said other mirror and to one of said orthogonal coordinate axes, means projecting an image of said designation onto said screen whereby displacement of the projected image by oscillation of said one mirror causes a rotation of said designation on said screen, and compensating means controlled by movement of said one mirror coupled to said drive to compensate for said rotation.

References Cited in the file of this patent
UNITED STATES PATENTS

| Number | Name | Date |
|---|---|---|
| 1,806,452 | Fulgora | May 19, 1931 |
| 1,881,011 | Wittkuhus | Oct. 4, 1932 |
| 1,933,650 | Bascom | Nov. 7, 1933 |
| 2,131,952 | House | Oct. 4, 1938 |
| 2,300,947 | Liwschitz | Nov. 3, 1942 |
| 2,342,938 | Hopkins | Feb. 29, 1944 |
| 2,421,077 | Miller | May 27, 1947 |
| 2,460,841 | Morey et al. | Feb. 8, 1949 |
| 2,495,296 | Springer | Jan. 24, 1950 |